Oct. 30, 1962　　　H. SCHMIDT　　　3,061,175
COMPRESSOR
Filed Aug. 12, 1960
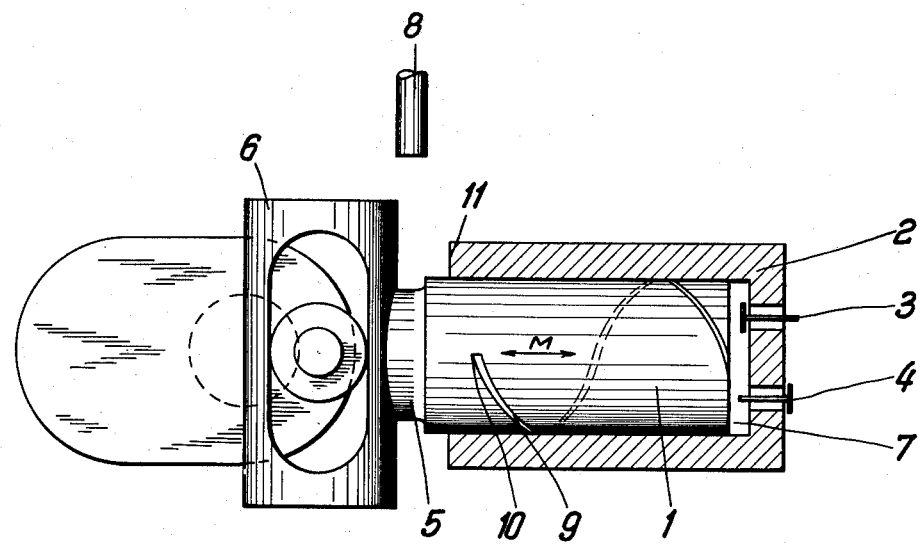

United States Patent Office 3,061,175
Patented Oct. 30, 1962

3,061,175
COMPRESSOR
Hans Schmidt, Bad Homburg vor der Hohe, Germany, assignor to Danfoss Company, Nordborg, Denmark, a corporation of Denmark
Filed Aug. 12, 1960, Ser. No. 49,292
Claims priority, application Germany Aug. 27, 1959
3 Claims. (Cl. 230—24)

The starting of motor driven piston compressors is frequently rendered difficult by the fact that while the compressor is at rest a pressure higher than the suction pressure builds up inside the cylinder. In a refrigerator, for example, it is possible for vapors of the working fluid to enter the cylinder space through a leak in the pressure valve, thus raising the pressure inside the cylinder above the suction pressure. The driving motor hence has to supply a greater starting torque than would be necessary if high suction pressures obtained in the evaporator during starting.

In order to facilitate starting, particularly in the case of a small enclosed refrigeration plant with capillary tube operation, it is known to provide the disc of the suction valve with a fine hole or to provide the valve seat of the suction valve with a fine scratch so that the excess pressure building up when the machine is at rest may be reduced, or can be partly reduced during a slow start. For the same purpose, holes have been provided in the cylinder wall, preferably in the vicinity of the bottom dead center. All these steps enable a smaller and cheaper motor to be used but will, without exception, result in a reduction of volumetric efficiency, or will not be uniformly effective in every position of the piston.

According to the present invention these drawbacks are overcome—based on the fact that most types of piston compressors work with liquid lubrication between the piston and the cylinder wall—by the provision of one or more lubrication grooves having such a shape that when they are not filled with lubricant, they constitute a pressure release capillary which connects the cylinder space wholly, or nearly so, with the outside atmosphere.

During the operation of the compressor, the lubrication groove is filled with the liquid lubricant such as oil, for example. This ensures an adequate seal against escape of the compressed fluid during operation. When the machine is at rest, however, the oil may be forced out of the lubrication groove by excess pressure which may obtain inside the cylinder space, so that the groove functions, as required, as a release capillary which allows the excess pressure to be reduced. Friction forces retaining some oil in the lubrication groove ensure that this relief of pressure does not take place unless there is a relatively high excess of pressure inside the cylinder space which would render starting difficult.

It is an advantage of this arrangement that the lubrication groove and the pressure release capillary form one unit, but that they function nevertheless as a lubrication groove and as a pressure release capillary at the appropriate time without affecting the efficiency of the compressor in any way.

The grooves are preferably cut into the surface of the piston. A better distribution of the lubricant will result therefrom since the groove emerges periodically from the cylinder wall and can then be filled for example by means of simple drip lubrication.

In a preferred embodiment the grooves start at the end face of the piston and end a few millimeters within the piston cylinder when the piston is in its upper dead center position. Thus the end of the groove is completely covered during the end of the piston stroke before it reaches the upper dead center position, so that the cylinder space is tightly sealed even under high compression pressures.

It is recommended that the grooves be cut helically around the piston and with this arrangement it is sufficient to provide one groove in the form of a helix. The helix improves distribution of the lubricant and makes the groove long enough to eliminate any risk that the lubricant may be blown out of the lubrication groove during operation.

Further features of the invention are contained in the following description of an embodiment which will be described in greater detail with reference to the accompanying drawing which shows partly in section, a plunger piston and cylinder of a refrigerator compressor.

Referring to the drawing, a plunger piston 1 reciprocates in the usual manner in a cylinder 2 provided with a suction valve 3 and a delivery valve 4. The plunger piston is joined by a shank 5 to a block 6 by means of which it is moved to and fro by a motor in the direction of the arrow at M. In the position as drawn, the piston occupies the upper dead center position, that is to say the cylinder space 7 is just equal to the clearance volume. Outside the cylinder, a feed pipe 8 is provided through which drip lubrication is applied to the surface of the piston 1.

A groove 9 is cut into the piston surface taking the form of a turn of a helix extending from the end face of the piston to a point 10 which in the upper dead center position of the piston lies a few millimeters inside the lower edge 11 of the cylinder 2.

In operation, the lubrication groove 9 is filled from time to time with oil from the drip lubricator 8 which will flow in a direction towards the end face of the piston. This provides an excellent seal so that not more than a negligible proportion of the working fluid which is to be compressed can escape along this helical path. On the other hand, when the machine is at rest and a pressure higher than the suction pressure builds up inside the cylinder space 7, the working fluid will tend to force the oil out of the groove 9, so that should the pressure build-up be sufficient to force substantially all the oil from the groove then the latter will function as a pressure release capillary.

The distance between the end point 10 of the groove 9 and the lower edge 11 of the cylinder provides a particularly effective seal during the high compression pressures in the neighborhood of the upper dead center. It will be understood that this seal will also prevent any release of pressure when the piston comes to rest at the upper dead center and pressure above atmospheric then obtains in the cylinder space 7. However, this is not a disadvantage, since there is no difficulty in starting a piston which occupies its upper dead center position.

The shape, cross-sectional area, length and number of the grooves depend on the conditions in any individual case. The dimensions are critical and must be so selected that on the one hand the lubricant will not be blown out during operation and on the other hand pressure is relieved before too high a value is reached.

Dimensions suitable for different sizes of compressors are indicated by the following examples.

|  | Example A | Example B |
|---|---|---|
| Diameter of piston | 30 mm | 25 mm. |
| Length of stroke | 16 mm | 12 mm. |
| Compression ratio (for F12) | 4 ./. 12 | 4 ./. 12. |
| Width of groove | 0.25 mm | 0.33 mm. |
| Depth of groove | 0.15 mm | 0.2 mm. |
| Cross-sectional area of groove | 0.037 mm.$^2$ | 0.066 mm.$^2$ |
| Total length of groove | 62 mm | 85.5 mm. |
| Distance from end of groove to open end of cylinder at top of compression stroke. | 5 mm | 3 mm. |
| Groove extension on piston periphery | <180° | 360°. |

It will be understood that these examples indicate the relationship between the several values and that the invention is in no way limited to the individual examples given.

What I claim and desire to secure by Letters Patents is:

1. A motor driven gas compressor comprising a cylinder having an open end and a closed end and having a cylinder wall surface, a piston extending into said cylinder through said open end reciprocable in said cylinder and having a piston wall surface slidably engaging said cylinder wall surface and having an end face, said cylinder and piston defining a variable volume compression space between the closed end of said cylinder and said end face of the piston, inlet and outlet valve means for said compression space, said piston wall surface having at least one groove extending from said end face in a direction toward the open end of the cylinder and terminating at a point on said piston wall disposed within the cylinder adjacent said open end of the cylinder when said piston is at a dead center position of its compression stroke, and pressureless lubricating means positioned outwardly of the cylinder to supply lubricant free of pressure to lubricate said wall surfaces and to fill said groove during reciprocation of said piston to seal said groove against escape of gas from said compression space to the exterior, said lubricant being expelled from said groove by gas pressure when said compressor is idle and said groove is in communication with the atmosphere to permit escape of excess gas pressure from said compression space and thereby facilitate restarting of the compressor.

2. A motor driven gas compressor comprising a cylinder having an open end and a closed end and having a cylinder wall surface, a piston extending into said cylinder through said open end reciprocable in said cylinder and having a piston wall surface slidably engaging said cylinder wall surface and having an end face, said cylinder and piston defining a variable volume compression space between the closed end of said cylinder and said end face of the piston, inlet and outlet valve means for said compression space, said piston wall surface having at least one helical groove extending from said end face in a direction toward the open end of the cylinder and terminating at a point on said piston wall disposed within the cylinder adjacent said open end of the cylinder when said piston is at a dead center position of its compression stroke, and pressureless lubricating means positioned outwardly of the cylinder to supply lubricant free of pressure to lubricate said wall surfaces and to fill said groove during reciprocation of said piston to seal said groove against escape of gas from said compression space to the exterior, said lubricant being expelled from said groove by gas pressure when said compressor is idle and said groove is in communication with the atmosphere to permit escape of excess gas pressure from said compression space and thereby facilitate restarting of the compressor.

3. A motor driven piston compression according to claim 2, in which said groove consists of only one turn of a helix.

References Cited in the file of this patent

UNITED STATES PATENTS

| 1,283,120 | Ellis | Oct. 29, 1918 |
| 1,528,817 | Dinnes | Mar. 10, 1925 |
| 1,702,145 | Wilson | Feb. 12, 1929 |
| 1,840,045 | McCormack | Jan. 5, 1932 |
| 2,138,664 | Money | Nov. 29, 1938 |